Dec. 14, 1943. D. J. CRAWFORD 2,336,469
PROTECTIVE VISION DEVICE
Filed July 11, 1941 2 Sheets-Sheet 1
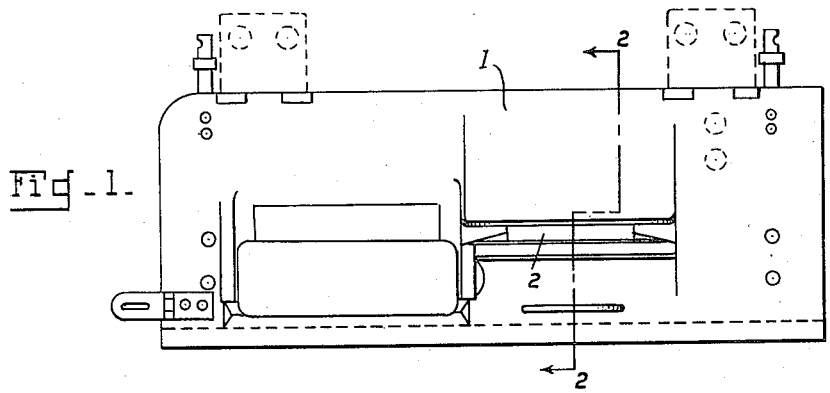
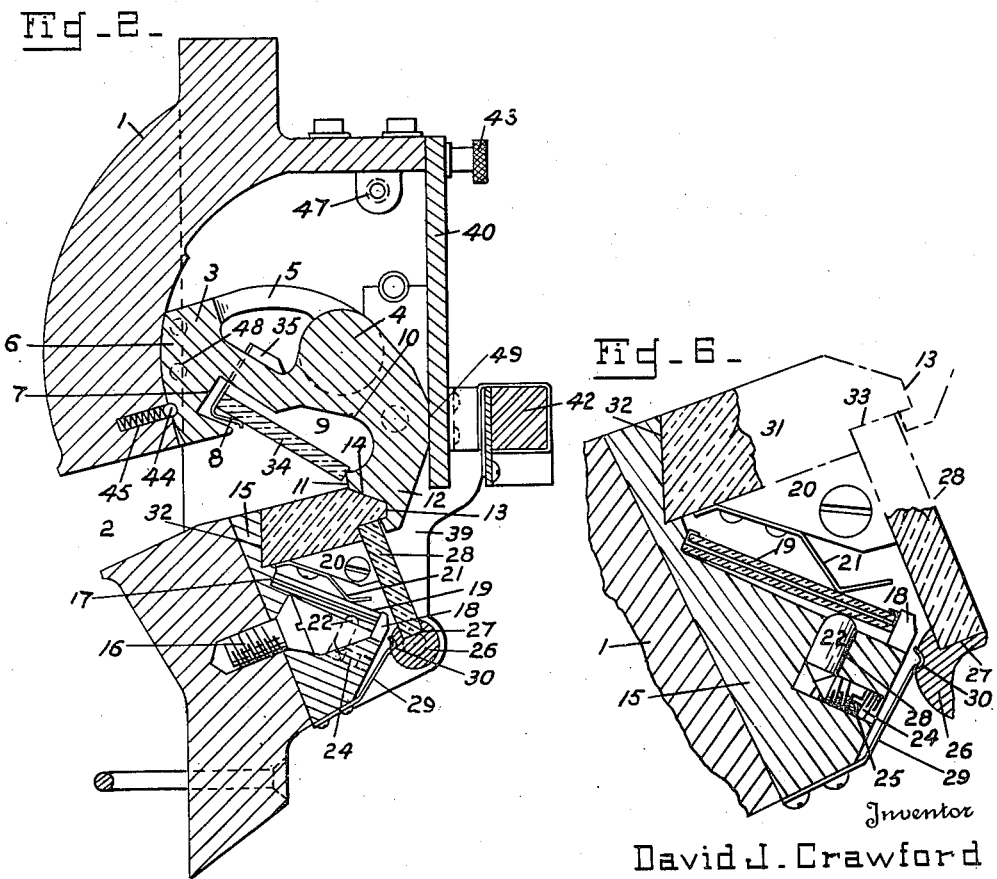
Inventor
David J. Crawford Dec. 14, 1943.　　D. J. CRAWFORD　　2,336,469
PROTECTIVE VISION DEVICE
Filed July 11, 1941　　2 Sheets-Sheet 2
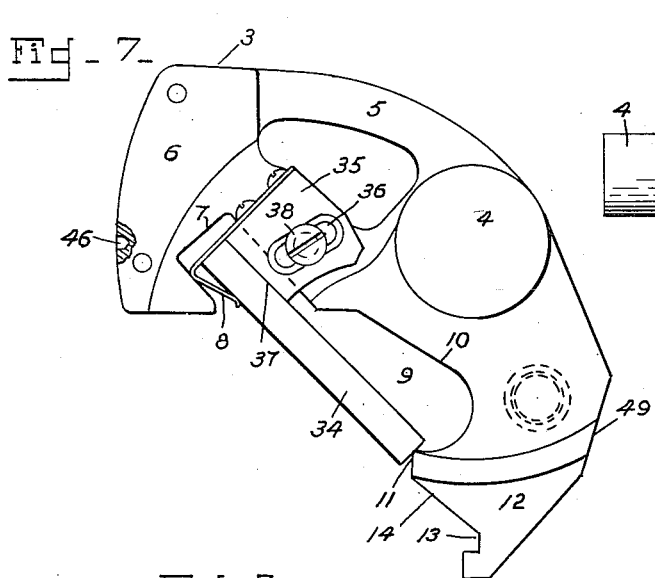
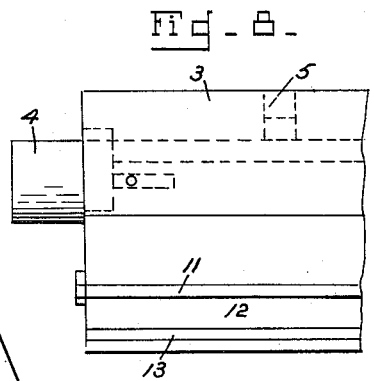
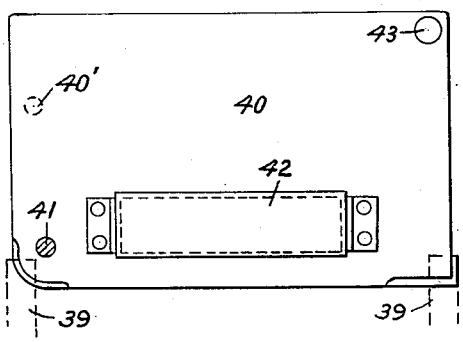
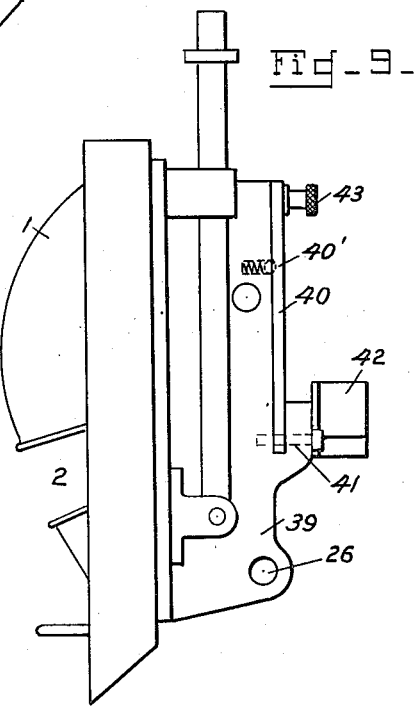
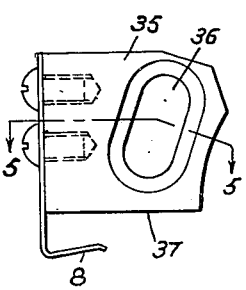
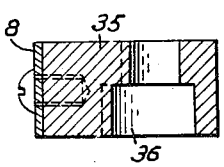
Inventor
David J. Crawford
By *GJKessenich + JHChurch*
Attorneys Patented Dec. 14, 1943

2,336,469

UNITED STATES PATENT OFFICE 2,336,469

PROTECTIVE VISION DEVICE

David J. Crawford, United States Army, Durant, Miss.

Application July 11, 1941, Serial No. 401,988

11 Claims. (Cl. 88—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to observation devices, and more especially to a protective observation device permitting indirect vision from an armored device.

An object of the invention is to provide an armored mounting for an optical system which will permit rapid replacement of optical elements damaged by projectiles.

One of the objects is to provide a housing for optical elements which is adapted to barricade an observation aperture in an armored device during the replacement of damaged elements.

Another object of the invention is to provide a protective housing for an indirect observation system which is adapted for movement to permit unobstructed vision.

Another object of the invention is to provide a mounting for an optical system in an armored device which will permit convenient adjustment of the optical elements to meet the vision peculiarities of the individual observer.

A further object of the invention is to provide a rugged, adjustable, projectile eliminating support for a periscope in an armored device.

The specific nature of the invention as well as other objects and advantages thereof will clearly appear from a description of a preferred embodiment as shown in the accompanying drawings in which:

Fig. 1 is a view in front elevation of protective armor provided with an observation slit, Fig. 2 is an enlarged section on the line 2—2 of Fig. 1 showing details of construction, Fig. 3 is a rear elevation showing the door lock for the rotor, Fig. 4 is an enlarged side view illustrating one of the mirror retainers, Fig. 5 is a sectional view on the line 5—5 of Fig. 4, Fig. 6 is an enlarged fragmentary side elevational view with parts in section showing the lower mirror mounting and an adjustment feature, Fig. 7 is an enlarged end view of the deflector showing the upper mirror adjustment feature, Fig. 8 is an elevational view of a portion of the deflector, and Fig. 9 is a side elevation of the armored housing which supports the protected indirect vision system.

In the accompanying drawings, protective armor 1 of suitable material and dimension is employed as a defense against projectiles. An observation slit or aperture 2 appears in the armor plate 1. A specially shaped deflector or closure 3 is mounted so that it may oscillate about trunnions 4 attached to the armored frame. Deflector 3 is made of projectile repelling material and is provided with a handle 5 to facilitate indexing to the selected position. The protective armor 1 adjacent the observation slit 2 is curved to conform to the arcuate path taken by the end of deflector 3 when it is rotated to its several positions.

A hood 6 on the front portion of the deflector 3 is employed to seal the slit 2 in one of the deflector positions. A longitudinal channel 7 appears on the lower rear surface of the hood 6 and receives a pair of spring clips 8 at opposite ends of the channel. A chamber or cavity 9 having a curved wall 10 and an open front is provided beneath the trunnion 4 in such manner as to be in alignment with the observation slit 2 when the deflector or closure 3 is in the position shown in Fig. 2. The lower part of the cavity 9 terminates in an angular lip 11 for a purpose which will be described later. A tail 12 on the lower rear section of the deflector 3 is provided with a groove 13 having a tapered upper face 14.

Beneath the observation slit 2 there is provided a metal block 15 which is secured to the armor plate 1 by fasteners 16 and formed with a groove 17 and shoulder 18, see Figs. 2 and 6. Groove 17 and the shoulder 18 receive a mirror 19 which constitutes one of the elements of the indirect observation system. Near each end of the mirror 19 is a bracket 20 which is attached to the protective armor by suitable means. A leaf spring 21 is fastened to each bracket 20 and has its free end resting in pressure engagement with the mirror face to retain it securely in position. A pair of smooth plungers 22 rest in spaced bores 23 in the block 15 and have their upper ends bearing on the base of mirror 19. Intersecting each bore 23 is a threaded recess 24. Adjusting screws 25 with conical points are threaded into the recesses 24 and engage the inner ends of the plungers 22. Movement of the screws 25 will elevate or lower the mirror 19 and provide angular adjustment.

A shaft 26 is journaled in a pair of notched brackets 39 secured to the armor plate 1 in spaced relation and has a longitudinal trough 27 to receive a window 28. The window is preferably cemented in the trough. Rotation of shaft 26 from its normal position illustrated in Fig. 2 is prevented by spring detents 29 which rest in notches 30 at the ends of the shaft.

A thick window 31 sets in a retaining groove 32 in the block 15 and the groove 13 in the tail of deflector 3. The window 31 is provided with a notch 33 in its lower face to receive the upper end of window 28. This wedges the window 31 into position. A mirror 34 of a brittle material has its upper end clamped by the spring retaining clips 8 and its lower end sets on the angular lip 11. In this fashion it is held securely in position and seals the opening to cavity 9. The mirrors 34 and 19 are so disposed that a ray of light which enters the observation slit is reflected by mirror 34 to mirror 19 and then through window 28 to the eye of the observer below the level of the observation slit.

The spring clips 8 are attached to a pair of cam blocks 35 which in turn are adjustably mounted on opposite ends of the deflector 3, see Figs. 2 and 7. Each cam block 35 is provided with an elongated arcuate slot 36 and has a flat end 37. A set screw 38 passes freely through the slot 36 and clamps the cam block 35 to an end of the deflector 3. The mirror 34 is held against the flat ends 37 by the pressure of the spring clips 8. Angular adjustment of the mirror 34 about lip 11 as a fulcrum is accomplished by loosening the set screws 38 and moving the blocks 35. The elongated apertures 36 permit a limited movement about the set screw and allow adjustment of the mirror to meet the peculiarities in vision of the individual observer. When the optimum position is found, the screws 38 may be tightened to secure the mirror 34 in position.

Resting in notched brackets 39 on the armor plate 1 is a plate or door 40 mounted on a pivot 41 for movement in its own plane, see Figs. 2 and 3. The door 40 abuts the rear of the deflector 3 when it is in the position as shown in Fig. 2. In this manner it positively locks the deflector 3 against any rotation about the trunnions 4 which might be produced when a projectile strikes the wall 10. A resilient head rest 42 is fastened to the lower end of the door 40. The door is rotated by grasping handle 43 and swinging it counterclockwise. This permits the operator to grasp handle 5 to index the deflector 3 to a new position or to make adjustments on mirror 34. A suitable latch 40' is employed for locking the door 40 in position.

A spring pressed ball 44 in a socket 45 provided in the armor plate engages a recess 46 in the deflector 3 to retain it in the position shown in Fig. 2. The deflector may be rotated clockwise to present a direct view through aperture 2 in a manner to be described later. A similar locking means 47 engages a recess 48 in the side of deflector 3 to retain it in the new position. An application of force through handle 5 will release the deflector 3 from its spring-ball catch and permit it to be indexed.

A projectile which enters the observation slit 2 when the deflector is disposed as in Fig. 2 will strike the brittle reflector 34 and shatter it. The projectile in its flight ricochets on the curved wall 10 of cavity 9 and has its direction reversed so as to be ejected through the slit 2 by its own momentum. The momentum of the flying fragments of mirror 34 will carry them against the wall 10 and tend to redirect them through the slit 2. This feature will assist in making a quick replacement of the damaged mirror.

The plate 40 is rotated counterclockwise about its pivot 41 and the operator moves the deflector 3 downward by pressure on the handle 5 to block the slit 2 with the hood 6. In so moving the deflector 3 the groove 13 is taken out of confining engagement with the windows 31 and 28. Vertical pressure applied to spring catch 29 will free it from the recess 30. The window 28 on its shaft mounting 26 then may be swung clockwise and window 31 slipped out of place. A replacement for mirror 34 then may be inserted in the spring clips 8 and its lower edge placed on the lip 11. Window 31 is inserted in the groove in block 15 and the window support 26 is swung clockwise until the end of window 28 rests in notch 33. The deflector is then pulled clockwise about shaft 4 into the position shown in Fig. 2 where it is retained by the detent 44. The door or plate 40 then is swung back into engagement with the flat face 49 of the deflector to hold it firmly in position.

The periscope sight provides protected vision to an observer in the vicinity of the observation slit. The deflector and its reversing chamber eliminates the danger of bullet splash and provides a device which may be indexed to a slit obstructing position. A quick convenient replacement may be made for the damaged mirror without exposing the observer's hand or body to enemy gunfire. Thus safety is assured in both the viewing and the inoperative or mirror replacing positions.

It may become desirable to have direct vision through the slot 2. This is accomplished by removing windows 28 and 31 from the vicinity of the tail 11 of the deflector 3 as previously described. The deflector may then be rotated clockwise about trunnions 4 approximately 90° whereupon it is secured in that position by automatic latch 47—48.

As pointed out above, the deflector 3 may be rotated by the handle 5 into several selectable positions to provide indirect or direct vision throughout the slit or to obstruct the slit. These positions of the deflector are independently defined; the first by the ball 44, the second by the contact of the deflector with the lower wall of the slot and the third by the locking means 47. The terms "index," "indexing" and "indexed" are employed in the specification and claims to designate this movement of the deflector or closure 3 relative to the observation slit 2.

I claim:

1. An indirect observation device for an armored device comprising, an armor plate having an observation aperture, a movable closure for said aperture, a mirror seat on said closure, a frangible mirror in said seat, a wall on said closure adapted to eject through said unobstructed aperture projectiles and particles striking said wall, a window beneath said mirror, and a mirror beneath said window, said mirrors disposed as to transmit rearwardly light from said observation aperture.

2. An indirect observation device for an armored device comprising, an armor plate having an observation aperture, a movable closure for said aperture, an angularly adjustable mirror seat on said closure and a frangible mirror in said seat, a curved wall on said closure to eject through said aperture when unobstructed, projectiles and mirror particles striking said wall, a protective window beneath said mirror, and an angularly adjustable mirror beneath said window, said mirrors disposed as to transmit backwardly light entering said observation aperture.

3. In an armored device having an observation aperture, an indexing device mounted on an axis behind said aperture, a curved wall on said device for reversing the direction of projectiles striking said wall, a hood extending from said axis at an acute angle with said wall for presentation to seal said aperture, said device adapted to be indexed to a position providing unobstructed vision through said aperture.

4. An indexing device for use in conjunction with an observation aperture in an armored device comprising, a U-shaped block rotatable to three positions behind said aperture, one of the arms of said block adapted to barricade said aperture in one position, the wall between the arms of said block being curved and adapted, in a second position, to eject through said aperture projectiles striking said wall, said block being indexable to a third position to provide direct vision through said aperture.

5. In an observation device for an armored device, an armor plate having an observation aperture, indexing means behind said aperture to provide direct, indirect, and obstructed vision, said indexing means including a surface, a movable plate on said armor to engage said surface in the position providing indirect vision to prevent movement of said indexing means when hit by a projectile.

6. In an observation device for an armored device, an armor plate having an observation aperture, indexing means behind said aperture to provide direct, indirect, and obstructed vision, said indexing means including a flat surface, a rotatable plate on said armor to engage said flat surface in the position providing indirect vision to prevent movement of said indexing means when hit by a projectile.

7. An indirect observation device for use in conjunction with an observation aperture in an armored barrier comprising, an indexing means behind said aperture, a curved wall on said barrier for reversing the direction of projectiles striking said wall, a hood on said indexing means for closing said aperture in a second position, an optical element, means for retaining said optical element on said indexing means, a protective window, a tail portion on said indexing means having a tapered groove for engaging one end of said window, a tapered groove on said barrier for engaging the opposite end of said window, an optical element, a seat on said barrier for said last mentioned optical element, a rotary window of said barrier for locking engagement with said first mentioned window, and a latch for said rotary window, said optical elements disposed as to transmit backwardly light entering said observation aperture.

8. An adjustable holder for detachably engaging a mirror in a periscope device, said holder comprising a plate having an elongated aperture, a spring clamp on said plate for retaining one end of said mirror against said plate, a support for said holder, and a set screw on said support passing loosely through the aperture in said plate for adjustably clamping said holder to said support.

9. An adjustable holder for detachably engaging a mirror in a periscope device comprising, a plate having an elongated aperture, a spring clamp on said plate for retaining one end of said mirror against said plate, a support for said holder, and a set screw on said support passing loosely through the aperture in said plate for adjustably clamping said holder to said support, and a lip on said support to engage the other end of said mirror.

10. A holder for an angularly adjustable mirror in a periscope device comprising, a seat for said mirror, a plunger having a tapered end in a recess in said seat, said plunger engaging the base of said mirror, an adjusting screw in a threaded recess in said seat intersecting said first mentioned recess, said screw engaging the tapered end of said plunger, and a resilient member engaging the top of said mirror to retain it in its seat.

11. In combination, an adjustable holder for detachably engaging the upper mirror in a periscope, said holder having an elongated aperture, a spring clamp on said holder for retaining one end of said mirror against said holder, a support for said holder, a set screw on said support passing loosely through the aperture in said holder for adjustably clamping said holder to said support, and a lip on said support to engage the other end of said mirror, a seat spaced from said holder for an angularly adjustable lower mirror, a plunger having a tapered end in a recess in said seat, said plunger engaging the base of said mirror, an adjusting screw in a threaded recess in said seat intersecting said first mentioned recess, said screw engaging the tapered end of said plunger, and a resilient member engaging the top of said mirror to retain it in position.

DAVID J. CRAWFORD.